United States Patent [19]

Sapp et al.

[11] Patent Number: 5,375,689
[45] Date of Patent: Dec. 27, 1994

[54] CONTROLLED FLOW GRAVITY CONVEYOR SYSTEM AND METHOD

[75] Inventors: Gordon K. Sapp; Mark W. Henson, both of Danville, Ky.

[73] Assignee: FKI Industries, Inc., Fairfield, Conn.

[21] Appl. No.: 65,675

[22] Filed: May 21, 1993

[51] Int. Cl.$^5$ .......................................... B65G 13/075
[52] U.S. Cl. ................................................ 193/35 A
[58] Field of Search ........................ 193/35 A; 198/781

[56] References Cited

U.S. PATENT DOCUMENTS

| | | | |
|---|---|---|---|
| 2,607,459 | 8/1952 | Ludwig et al. | |
| 3,627,091 | 12/1971 | Fleischauer et al. | 193/35 A |
| 3,627,092 | 12/1971 | Fleischauer et al. | 193/35 A |
| 3,696,912 | 10/1972 | Fleischauer et al. | 193/35 A |
| 3,724,642 | 4/1973 | De Good | 193/35 A X |
| 4,219,115 | 8/1980 | Moore | 193/35 A X |
| 4,236,865 | 12/1980 | Ullman et al. | |
| 4,383,598 | 5/1983 | Newman | 193/35 A |
| 4,488,638 | 12/1984 | Morgan et al. | 193/35 A X |
| 4,600,093 | 7/1986 | Adams et al. | |
| 4,809,836 | 3/1989 | Zilber et al. | |
| 5,048,660 | 9/1991 | Kilper et al. | |
| 5,086,903 | 2/1992 | Agnoff | 193/35 A |

FOREIGN PATENT DOCUMENTS

| | | | |
|---|---|---|---|
| 2245952 | 3/1973 | Germany | 193/35 A |
| 3337552 | 4/1985 | Germany | 193/35 A |
| 1207907 | 1/1986 | U.S.S.R. | 193/35 A |
| 1286479 | 1/1987 | U.S.S.R. | 193/35 A |

Primary Examiner—D. Glenn Dayoan
Attorney, Agent, or Firm—Gilliam & Stockwell

[57] ABSTRACT

A gravity conveyor system is disclosed including a device for actively stopping the rotation of the conveyor rollers following disengagement with a conveyed article after it passes thereover and in advance of a next succeeding article. This allows each article to accelerate an engaged roller from a rest position so that precise transport control is effected without the use of positive drive mechanisms. Accurate control for throughput and accumulation results from cooperation between brake assemblies associated with each conveyor roller, a sensor assembly and a pneumatic control assembly, each combination of which acts in an operational zone. The rotation of the rollers is preferably stopped as a function of the sensed position of articles along the system. The pneumatic control assembly further includes a logic control mechanism that operates to selectively control the application of braking action either momentarily to allow continued controlled throughput or for a prolonged period of time to allow controlled accumulation. The gravity control system acts to practice a method for controlling the transport of articles without positive drive assistance in reliance on stopping the rotation of the rollers after an article has passed thereover and in advance of a next succeeding article. The apparatus and method further provide a device for stopping articles at the discharge point of the conveyor system without the need for extraneous stop mechanisms.

37 Claims, 5 Drawing Sheets

CONTROLLED FLOW GRAVITY CONVEYOR SYSTEM AND METHOD

TECHNICAL FIELD

The present invention relates to conveyor systems and, more particularly, to a gravity conveyor system whereby accurate and precise transport control of articles is provided. The invention also contemplates a method of controlling the flow of articles on a conveyor without positive drive assistance.

BACKGROUND OF THE INVENTION

Conveying systems are utilized in a variety of industrial settings. Manufacturing plants need such systems to quickly and efficiently transport articles between forming and assembling stations. Warehousing facilities transport articles between storage areas and/or to a loading dock with the use of conveying systems.

As production requirements have increased, it has become necessary to improve the speed of the transport systems within these facilities. This in turn has increased the need to control the conveyance of articles as they proceed along the desired travel path. Flow control is particularly important when the conveyed articles are subject to breakage. In this instance, it is critical to prevent a jarring impact when an upstream article catches up to a slower moving or stopped downstream article.

The speed and efficiency of movement along a conveyor system has evolved through the use of positive drive systems. The positive drive system typically involves the use of a prime mover, such as a motor, driving a timing belt that in turn drives the conveyor rollers to rotate at the desired angular velocity. Accordingly, the forward movement of articles traveling on the conveyors is predictably controlled.

It can be appreciated that the use of positive drive systems requires substantial capital investment as the drive components are incorporated within the conveyor system. Furthermore, the drive components require constant maintenance and increase the chance of failure and shutdown of the conveying system. The positive drive system also generates substantial energy costs during conveying operation.

Conveyor artisans have long recognized the advantage of relying upon gravity to effect the movement of articles from one place to another. Gravity conveyors obviously eliminate the need for positive drive mechanisms and the problems associated therewith. In spite of these advantages, gravity conveyors historically have been avoided because of the difficulty of transport control. Gravity conveyors have been particularly ill-suited for transport of articles of varying size and weight. In general, the terminal velocity of articles traveling on prior art gravity conveyors has not been predictable due to the above-described variables, as well as gap variation between articles.

In view of the basic simplicity and cost benefits of gravity conveyor systems, artisans have continued to attempt to find solutions to the problem of transport control associated therewith in order to avoid the use of positive drive systems. A common approach has been the integration of inertial devices within the gravity conveyor system to retard the forward movement of articles thereon. By varying the inertia of the conveyor rollers, a measure of control can be imposed on the system. An example of such an approach is disclosed in U.S. Pat. No. 2,607,459 to Ludwig et al., entitled "Retarding Roller for Conveyors". The Ludwig et al. roller contains a fluid that acts to slow rotation by shifting to seek a common level within the roller housing. This approach is illustrative of prior art attempts to promote control through passive means.

Various braking systems have also been devised for gravity conveyors. While the use of brakes to retard the rotation of rollers is not new, braking systems have previously been used principally to slow the forward movement of the article along the conveyor. Examples of different braking systems are disclosed in U.S. Pat. Nos. 5,048,660 to Kilper; 4,044,876 to Hammond; and 4,600,093 to Adams.

None of the above-cited references allow gravity conveyor systems to control the transport of articles with the desired precision and accuracy that is required by many modern facilities. There is thus a continuing need for a conveying system that can operate under gravity flow and provide the predictable transport capability that heretofore has only been available with conveyor systems using positive drive mechanisms. Such a gravity conveyor system would provide the desired control at a significantly lower cost and with greater simplicity than a system employing a positive drive mechanism.

SUMMARY OF THE INVENTION

It is accordingly a primary object of the present invention to provide a conveyor system that provides predictable and accurate transport control while using gravity as the motive force.

Another object of the present invention is to provide a gravity conveyor system wherein the kinetic energy of the traveling article is uniformly transferred to the conveyor rollers.

Still another object of the present invention is to provide a gravity conveyor system that readily predicts and prevents impacts between adjacent articles.

Yet another object of the present invention is to provide a gravity conveyor system that handles fragile articles while substantially eliminating the opportunity for breakage.

A further object of the present invention is to provide a gravity conveyor system that allows accumulation of articles without sudden impacts therebetween.

An additional object of the present invention is to provide a gravity conveyor system that ensures separation of a train of articles as they proceed along the conveyor surface.

Still another object of the present invention is to provide a gravity conveyor system that is capable of stopping articles at the discharge end without requiring an extraneous stop mechanism.

Yet another object of the present invention is to provide a gravity conveyor system that substantially eliminates line pressure between accumulated articles.

Still another object of the present invention is to provide a gravity conveyor system wherein the terminal velocity of a transported article is accurately predicted.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved gravity conveyor system is provided whereby accurate and predictable flow control is effected. The system comprises a plurality of conveyor rollers disposed from a source point to a discharge point and on which transported articles travel. The rollers are supported in a declined configuration in the direction of travel to allow gravity to provide the motive force. In its broadest aspects, the invention further includes means for actively stopping the rotation of the rollers following the disengagement with an article after it passes thereover and in advance of the next succeeding article. In this manner, each transported article will always accelerate the rollers from a rest position upon initial engagement.

Through this improved design, the kinetic energy of each article is transferred to all of the conveyor rollers uniformly. Thus, the terminal or equilibrium velocity of articles can be predicted as a function of the known characteristics of the conveyor rollers, the weight of the article and the angle of incline of the system, it can thus be appreciated that flow control results in the operational environment of a gravity conveyor system.

In the preferred embodiment of the invention, the stopping means operates intermittently to momentarily stop the rotation of the rollers. Thus, there is no continuous application of a stopping or retarding force exerted on the rollers. The rollers are free to rotate when initially engaged by an article that passes thereover. In this manner, the kinetic energy of the traveling article is uniformly and consistently transferred as the roller accelerates from a rest position.

In addition, the stopping means is preferably adapted to alternately hold the rollers for a prolonged period of time to halt the forward movement of the article as it travels along the system. Accordingly, the system acts to controllably accumulate articles therealong if desired.

The preferred embodiment of the invention utilizes a plurality of brake assemblies that operate against the plurality of rollers to act as the stopping means. Desirably, one of each of said brake assemblies is disposed to operate against one of each of said plurality of rollers. The inventive system thus provides accurate control over the entire length of the transport surface.

Prior art gravity conveyor systems have required an external stopping mechanism at the discharge point against which the article impacts with a jarring force when it cannot be directly off-loaded from the system. An additional aspect of the system is defined by a means for stopping without impact the forward movement of an article at the discharge point of the system.

Preferably, the inventive system provides means to stop the rotation of the rollers situated in substantial proximity to the discharge point in advance of the arrival of one of the articles. Particularly, a plurality of brake assemblies as similarly used in the remainder of the system is controllably used and applied to an associated plurality of rollers situated near the discharge point.

In another of its broadest aspects, the invention includes means for sensing the position of an article at various points along the plurality of rollers. The sensing means is associated with the stopping means, the latter operating in response to the sensed position of the article after it has passed over the rollers and in advance of the next succeeding article. As stated above, this action provides precise transport control by ensuring through the sensed position of the article that all rollers are put in a rest position and accelerated therefrom when the next succeeding article engages and passes thereover. Control is thus effected without the need for a positive drive mechanism.

To facilitate system operation, the invention preferably includes means for selectively controlling the stopping means in response to the sensed position of an article. In a further aspect of the invention, the system is defined by a plurality of operational zones, each zone having an operable set of sensing means, stopping means and controlling means. In accomplishing its full range of controlled operation, there is included means for stopping the plurality of rollers momentarily to allow continued passage of the next succeeding article and means for stopping the plurality of rollers for a prolonged period of time to prevent continued passage of the next succeeding article. Thus, the invention provides two basic modes of operation: one being a continuous transport mode wherein articles travel unimpeded on the conveyor surface at an equilibrium velocity due to the acceleration of all conveyor rollers from a rest position, and the other being an accumulation mode wherein articles are intermittently stopped and held against travel on the conveyor surface until downstream conditions allow forward travel to be resumed. Each of these specific modes is implemented in accordance with the transport disposition of an adjacent downstream zone within the system. In conjunction with this effort, preferably the controlling means operates the stopping means to stop the rotation of the roller upstream from the sensing means.

The preferred embodiment further contemplates the sensing means being comprised of a plurality of sensor assemblies positioned at strategic points along the conveyor system. Each sensor assembly is preferably comprised of a bridge roller which is disposed between a sensor roller and a counterweight element. Pivot brackets mount the sensor assembly components together at each of their respective ends. This allows the sensor roller and counterweight element to pivot about the axis of the bridge roller. Accordingly, the sensor roller is normally presented in a raised position for engagement with a passing article, which then forces the sensor roller to pivot downwardly. The counterweight element pivots upwardly in response. After passage of the article, the counterweight element naturally descends to its rest position, causing the sensor roller to pivot back to its raised position in readiness for the next succeeding article.

The stopping means is preferably comprised of a plurality of brake assemblies that engage the plurality of rollers. Further, the controlling means preferably takes the form of a mechanical operating system.

In the particular preferred embodiment, a pneumatic control system is used for operational direction. The pneumatic control system influences the stopping means to alternatively stop the rotation of the rollers momentarily to facilitate controlled forward movement of the articles in the continuous transport mode or to stop the rotation of the rollers for a prolonged time period to facilitate accumulation of articles in the accumulation mode. This results in an ideal coordination between efficient and optimized forward transport while at the same time preventing damaging impact as articles are stopped along the system for various reasons.

The invention also contemplates the particular method of controlling the transport of articles along a conveyor system without positive drive assistance. In accordance with the preferred steps, a plurality of rollers is provided. The rollers are supported in a declined configuration in the direction of travel. As the articles travel along the conveyor rollers, the method further contemplates sensing their position at various points along the plurality of rollers. The preferred method also includes the step of stopping the rotation of the rollers in response to the sensed position of the passing article following disengagement therefrom and in advance of the next succeeding article. In this manner, the method brings about precise transport control while using gravity as the motive force.

In order to assist the proper operation of the inventive method, the process further includes the step of controlling the stopping of the rotation of the rollers in response to the sensed position of the article. The rotation of the rollers is stopped momentarily to allow controlled passage of the next succeeding article in a continuous transport mode or, alternatively, roller rotation is stopped for a prolonged period of time to prevent continued passage of the next succeeding article in an accumulation mode.

As practiced by the preferred apparatus, the inventive method preferably contemplates providing a plurality of operational zones in which transport control is effected. The method is further practiced by preferably including the step of stopping the rotation of the rollers in a zone upstream from the sensed position of an article. This allows the precise control for both article throughput and accumulation.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing.

Reference will now be made in detail to the present preferred embodiment of the invention, an example of which is illustrated in the accompanying drawing.

DETAILED DESCRIPTION OF THE INVENTION

Figure 1:
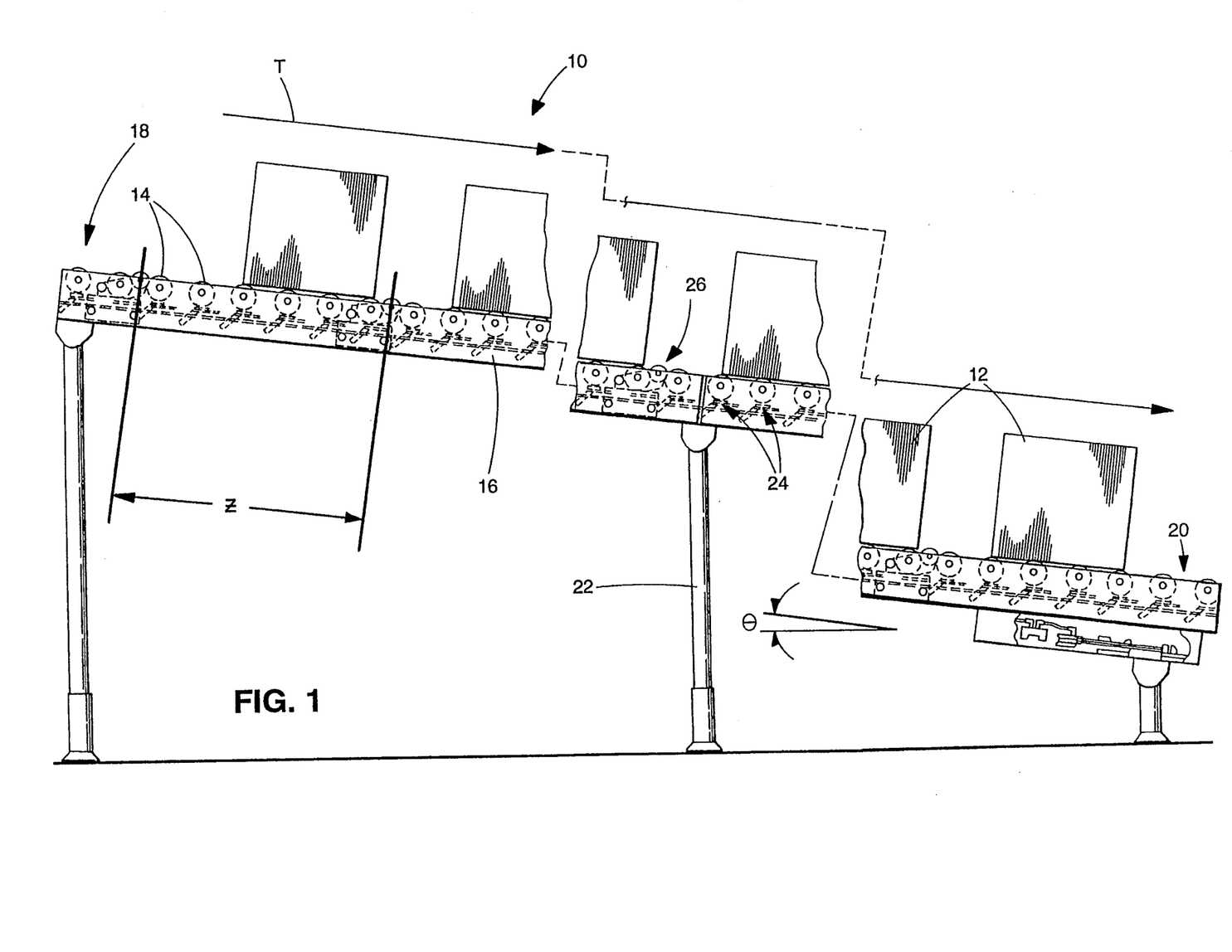
FIG. 1 is a side view of the conveyor system of the present invention, with portions broken away, accentuating the declined configuration which facilitates gravity control.

The controlled flow gravity conveyor system 10 constructed in accordance with the teachings of the present invention is shown in FIG. 1. The system 10 is designed to convey articles 12 on a transport surface defined by free-wheeling conveyor rollers 14. The conveyor rollers 14 are supported on a frame 16 in a direction transverse to that of article travel and are disposed between a source point 18 and a discharge point 20 of the system 10. The conveyor rollers 14 are supported in a declined configuration by brace uprights 22 of varying heights. The declined configuration is readily apparent in FIG. 1 and results in a downward pitch, defined by the angle $\Theta$, in the direction of travel noted by flow arrow T. Thus, the inventive system 10 operates with gravity as the motive force for propelling articles, eliminating the need to rely on positive drive mechanisms.

As described above, one of the drawbacks of prior art gravity conveyor systems has been the inability to provide precise and accurate control in the transport of articles. The present invention addresses the problem by actively stopping the rotation of the conveyor rollers 14 following disengagement with an article 12 after it passes thereover and in advance of a next succeeding article. This is in contrast to prior art designs utilizing inertial retarders in association with the conveyor rollers 14. As such, the inventive gravity conveyor system 10 relies upon the principle of consistent energy transferral. By ensuring that the rollers 14 come to rest prior to contact with following articles, uniform transfer of the kinetic energy of the articles to the rollers is facilitated. The operational theory contemplates that the kinetic energy of an article 12 traveling down the declined system 10 is equal to the kinetic energy expended in accelerating the roller 14 from rest. This results in the articles 12 maintaining an equilibrium velocity as they travel along the system 10 in a continuous transport mode. The equilibrium velocity can be accurately predicted based on system 10 and article 12 parameters, resulting in precise system control.

The concepts underlying the invention allows a designer to customize a gravity conveyor system 10 according to the specific needs of a user. More particularly, when given the weight or weight range of articles 12 to be conveyed, and acceptable limits for terminal or equilibrium Velocity, a designer can choose conveyor rollers 14 with the proper physical characteristics and set the system 10 to the proper angle of decline to provide the desired control.

The basic equation supporting the principle is:

$$V_T = 2.5D \sqrt{\frac{W_B(\tan\theta - f)g}{W_T K^2 n}}$$

where
- $V_T$ = terminal velocity
- 2.5 = conversion factor
- D = diameter of roller
- $W_B$ = weight of article
- $\theta$ = angle of decline
- f = rolling resistance of roller
- g = gravitational constant
- $(W_T K^2)$ = inertia of roller $$\left[\begin{array}{l} W_T = \text{weight of roller} \\ K = \text{radius of gyration of roller} \end{array}\right]$$

n = number of rollers per foot

In tests conducted to confirm the theory, measured terminal velocities have been within a range of 1%–5% of calculated values.

In the preferred embodiment of the invention, the stopping means takes the form of brake assemblies, noted generally in FIG. 1 as numeral 24. Desirably, each conveyor roller 14 has an associated brake assembly 24 that effects the braking action on that specific roller. The brake assemblies 24 are preferably adapted to cooperate with associated sensor assemblies 26 that are strategically positioned at various points along the conveyor system 10. The brake assembly 24/sensor assembly 26 combinations cooperate through a pneumatic control assembly 28 that takes advantage of a logic control mechanism 30 (see FIG. 8). In the particular preferred embodiment, the pneumatic control assembly 28 uses air pressure controlled by air logic. The operation of the component assemblies will be described in more detail below.

In one of the key aspects of the invention, the system 10 is formed with a plurality of operational zones. Preferably, each zone comprises a set of conveyor rollers 14 with associated brake assemblies 24, a cooperating sensor assembly 26 and an associated section of the pneumatic control assembly 28 with its logic control mechanism 30. The zone length is identified in FIG. 1 by the letter Z and, for ease of understanding, is defined by the distance between sensor rollers of adjacent sensor assemblies 26. It should be understood, however, that the sensor assembly 26 may be positioned at any of a number of points within the operational zone.

The drawing figures describe an operational zone as defined by six conveyor rollers 14. This zone length Z is simply a design example, as the zone length is in practice determined by the desired design parameters. Thus, the zone length Z can be defined by a lesser or greater number of conveyor rollers 14.

In addition to controlled throughput of articles 12 in the continuous transport mode according to the design principles described above, the inventive gravity conveyor system 10 also facilitates controlled accumulation of articles 12. Accumulation is accomplished by selectively controlling the brake assemblies 24 to stop the rotation of the conveyor rollers 14 within successive upstream zones for a prolonged period of time. This will cause an article 12 entering each zone to stop at successive upstream positions along the conveyor system 10. Thus, the inventive gravity conveyor system 10 advantageously provides a separate accumulation mode of operation, wherein articles may selectively be stopped at various positions along the conveyor system in accordance with flow conditions downstream.

By creating a means to stop the forward travel of articles 12 in contiguous zones, the inventive system 10 allows for accumulation without damaging impact between adjacent articles. A train of articles 12 can thus be maintained in separation regardless of whether the articles are continuously passed along the system 10 in the continuous transport mode or are accumulated thereon in the accumulation mode. Furthermore, this feature of the gravity conveyor system 10 substantially eliminates line pressure associated with accumulated articles 12.

It can be visualized that when a train of articles 12 accumulates through back-to-back contact on a freewheeling gravity conveyor, each article exerts a force on the contiguous downstream article. The article furthest downstream is thus subject to a tremendous load through the transmission of all forces down the line. The present invention virtually eliminates this circumstance since the brake rollers 14 in the accumulation mode prevent the articles 12 from moving forwardly. Thus, even if controlled accumulation results in resting contact between contiguous articles 12, there is no force exerted on the downstream article by the adjacent upstream article.

Figure 8:
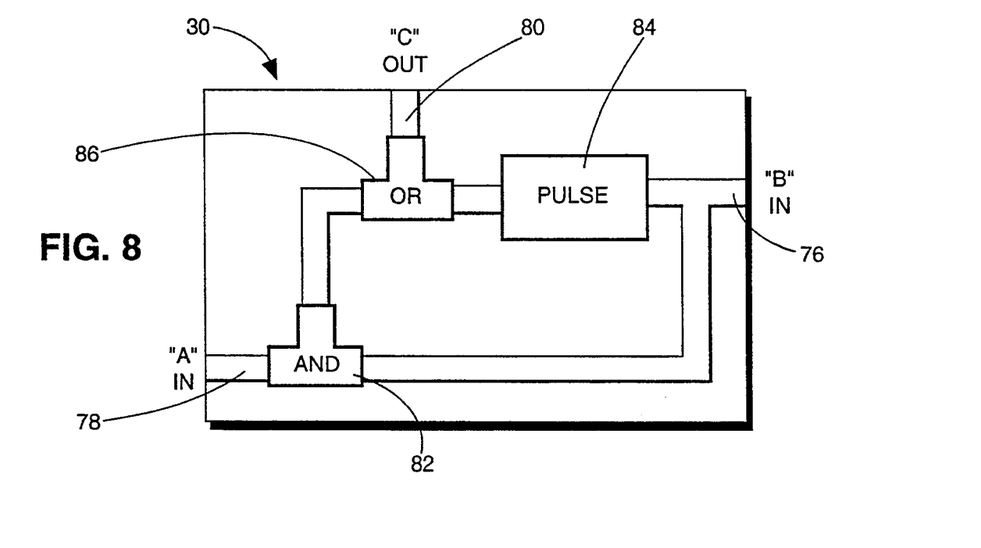
FIG. 8 is a line schematic illustration of the logic utilized in the pneumatic circuit to control operation of the gravity conveyor system.

The controlled accumulation aspect of the inventive system 10 follows from the ability to predict the equilibrium or terminal velocity of articles 12 during forward transport. This in turn allows for prediction of the stopping distance of an article 12 within an operational zone. The supporting equation is:

$$d = \frac{C\, WV_T^2}{FL\, Zg}$$

where
- d = stopping distance
- c = distance between roller centers
- F = braking force applied to a roller
- L = length of article
- W = weight of article
- $V_T$ = terminal velocity of article
- g = gravitational constant The manner in which the logical control operates to implement selection of throughput or accumulation operation is described in detail in association with FIG. 8 below.

Figures 2, 3A, 3B, 4:
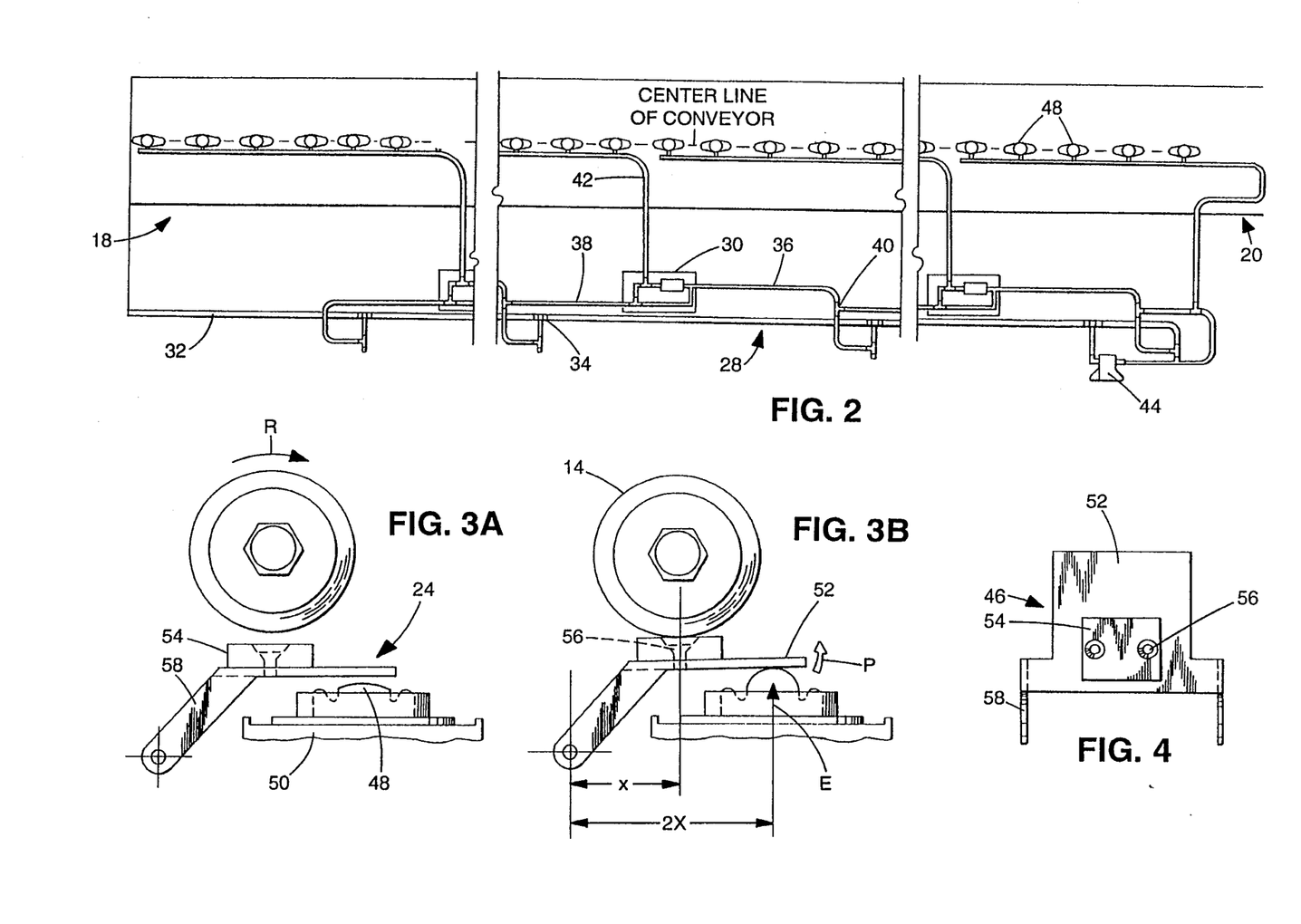
FIG. 2 is a view of the pneumatic circuit, with portions broken away, that cooperates with other components to control the operation of the inventive gravity conveyor system.
FIG. 3a is a side view of the brake assembly of the present invention with the operative components shown in inactive position allowing unobstructed roller rotation.
FIG. 3b is a side view similar to FIG. 3a, but showing the brake assembly in the active braking position to stop roller rotation.
FIG. 4 is a top view of the block brake of the brake assembly of the inventive gravity conveyor system.

The pneumatic control assembly 28 is shown in part in FIG. 2. An air pressure source (not shown) supplies a main conduit 32. The main conduit 32 extends the entire length of the gravity conveyor system 10. A series of air limit valves 34 are positioned along the main conduit 32, with each air limit valve associated with one of each of the operational zones. The air limit valves 34 are intermittently operable to allow passage of air pressure to a backflow conduit 36 and a proximate conduit 38 through a tee passage 40. The proximate conduit 38 leads to a logic control mechanism 30 within the same operational zone and the backflow conduit 36 leads to a like mechanism in the immediate upstream zone. As will be described in more detail, the preferred logic control mechanism 30 supplies air pressure in either one of two modes to a zone conduit 42, which ultimately directs air pressure to operate the brake assemblies 24 within the zone. The air limit valve 34 within a zone operates in response to the tripping of the sensor assemblies 26 within that zone.

The rightmost segment of FIG. 2 shows the portion of the pneumatic control assembly 28 associated with the zone at the discharge point 20 of the system 10. Control is preferably provided in the discharge zone by a release control valve 44. In the preferred operation of the inventive system 10, it is initially desired to stop a transported article in this last zone prior to discharge. This is accomplished by opening the release control valve 44 to supply air pressure, using appropriate logic instruction, to the zone conduit 42 in the discharge zone. This causes the brake assemblies 24 to hold the rollers 14 in the discharge zone against rotation, stopping an article 12 that enters the zone to prevent discharge and, if desired, initiate accumulation of articles.

The article 12 being held in the discharge zone is released by shifting the release control valve 44 to the exhaust position. This eliminates the flow of air pressure to the zone conduit 42 and thus deactivates the brake assemblies 24, allowing the rollers 14 to rotate without obstruction. The article 12 subsequently gravitates to discharge.

It can be appreciated from the discussion above that the preferred embodiment of the gravity conveyor system 10 provides a means for stopping articles 12 at the discharge point 20 without requiring an extraneous stop mechanism. Thus, as seen in FIG. 1, the zone adjacent the discharge point 20 does not contain a gate or other device against which an article 12 can impact with jarring force. This is a further benefit of operational control resulting from employing the teachings of the present invention.

Details of the brake assembly 24 are illustrated in FIGS. 3a, 3b and 4. A block brake 46 that pivots between active and inactive positions is utilized to facilitate the stopping of roller rotation. A diaphragm 48 cooperates to urge the block brake 46 to the active position for braking engagement with the associated conveyor roller 14.

More particularly, and as shown in FIGS. 3a and 3b, the diaphragm 48 operates between a rest position when air is not supplied (FIG. 3a) and an extended position when air is supplied (FIG. 3b). The diaphragm 48 is supported on a diaphragm mount 50. A port from the zone conduit 42 directs air pressure to the diaphragm 48. When extended, the diaphragm 48 engages a pad plate 52 on the block brake 46.

As shown in FIG. 4, the block brake 46 has a brake pad 54 attached by rivets 56 to the pad plate 52. Plate arms 58 are disposed on opposing sides of the block brake 46 and receive a pivot axle (not shown) that attaches the block brake to a supporting channel (also not shown). The pivoting action facilitates engagement between the brake pad 54 and the conveyor roller 14.

This is operationally shown in FIGS. 3a and 3b. In FIG. 3a, the diaphragm 48 is in a rest position and thus is not engaged with the pad plate 52 of the block brake 46. The brake pad 54 is not in contact with the conveyor roller 14 and thus the latter is free to rotate according to action arrow R.

When the rotation of the conveyor roller 14 is to be arrested to facilitate transport and accumulation control, air is directed to the diaphragm 48 which is extended pursuant to action arrow E to contact the pad plate 52 as shown in FIG. 3b. This action causes the pad plate 52 to pivot upward in accordance with action arrow P about the pivot axle. As a result of the upward pivoting, the brake pad 54 contacts the conveyor roller 14 and stops the rotation thereof.

The particular design of the brake assembly 24 provides subtle but significant advantages in the operation of the inventive system 10. More specifically, the contact point between the brake pad 54 and the conveyor roller 14 is at the midpoint between the vertical plane of the pivot point of the block brake 46 and the engagement point between the diaphragm 48 and the pad plate 52. As shown on FIG. 3b and with reference to the vertical plane of the pivot point, the engagement point between the brake pad 54 and the conveyor roller 14 is defined as a distance X therefrom while the engagement point between the diaphragm 48 and the pad plate 52 of the block brake 46 is thus at a distance defined by 2X. It has been determined that the preferred embodiment optimally uses the 2:1 distance ratio in order to provide the proper mechanical advantage while respecting space utilization.

The brake assembly 24 configuration also provides a measure of self-energization. More specifically, since the rotation of the conveyor roller 14 is clockwise in accordance with action arrow R, the frictional engagement between the roller and the brake pad 54 naturally urges the pad plate 52 to pivot upward, enhancing the force provided by the diaphragm 48.

Figure 5:
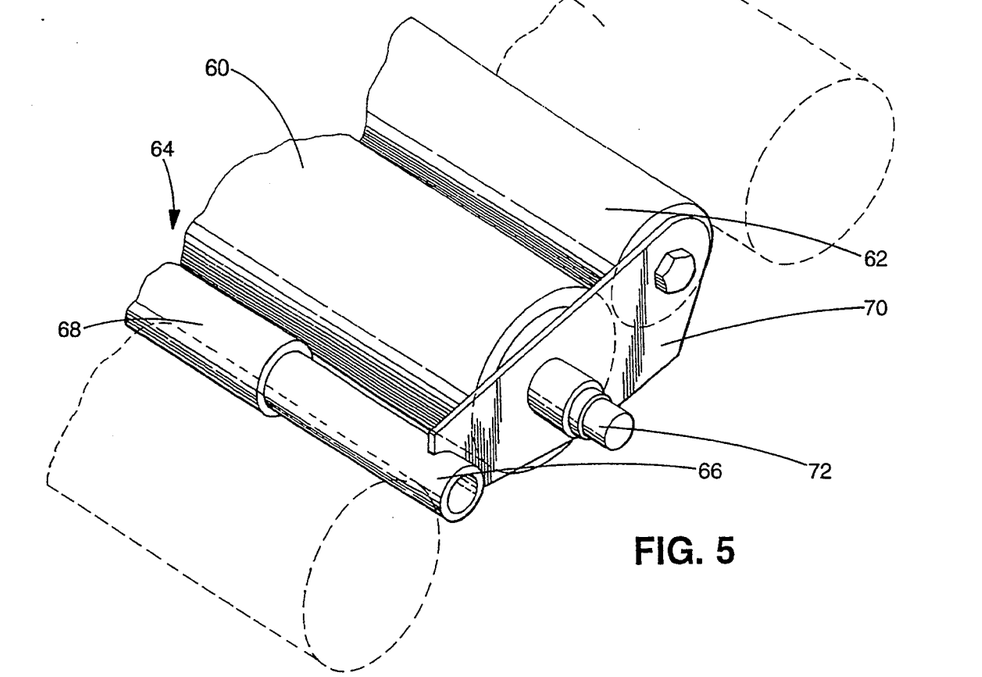
FIG. 5 is a perspective view of the sensor assembly utilized with the inventive gravity conveyor system, with two adjacent conventional conveyor rollers shown in phantom.
Figure 6:
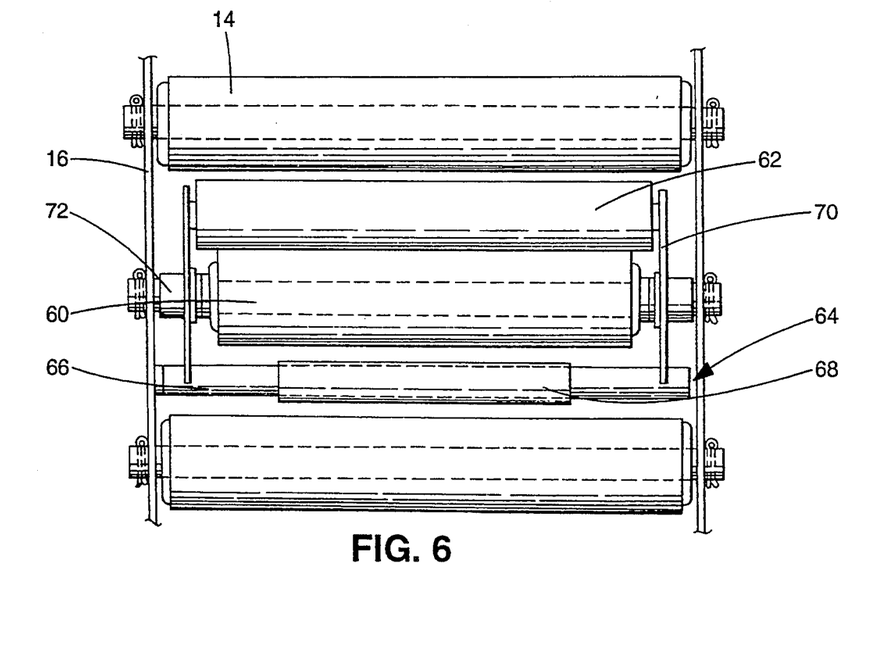
FIG. 6 is a top view of the sensor assembly shown between two conventional rollers.

The preferred embodiment of the sensor assembly 26 is illustrated in FIGS. 5 and 6. As stated above, a plurality of sensor assemblies 26 are positioned at various points along the conveyor system 10. Preferably, each operational zone has a sensor assembly 26 associated therewith and is positioned at the appropriate position within the zone to optimize operation. The sensor assembly 26 is comprised of a bridge roller 60 mounted between a sensor roller 62 and a counterweight bar 64. The counterweight bar 64 is preferably formed of a stock tube 66 having a sleeve 68 mounted thereon. The bridge roller 60, sensor roller 62 and counterweight bar 64 are cooperatively connected by a pair of pivot brackets 70 at opposing ends of component combination. The assembly 26 is mounted to the conveyor frame 16 by an adaptor 72 that extends from the bridge roller 60.

The bridge roller 60 is preferably the same diameter as the conventional conveyor rollers 14 but is of shorter length. Since the bridge roller 60 is mounted in similar fashion as the conventional rollers 14, it has similar freewheeling capability. Just as with the conventional conveyor rollers 14, each bridge roller 60 has a brake assembly 24 associated therewith.

Although the preferred embodiment contemplates a counterweight bar 64 having a sleeve 68, the counterweight bar may take the form of a square or round tube with interior weighting.

Figure 7A:
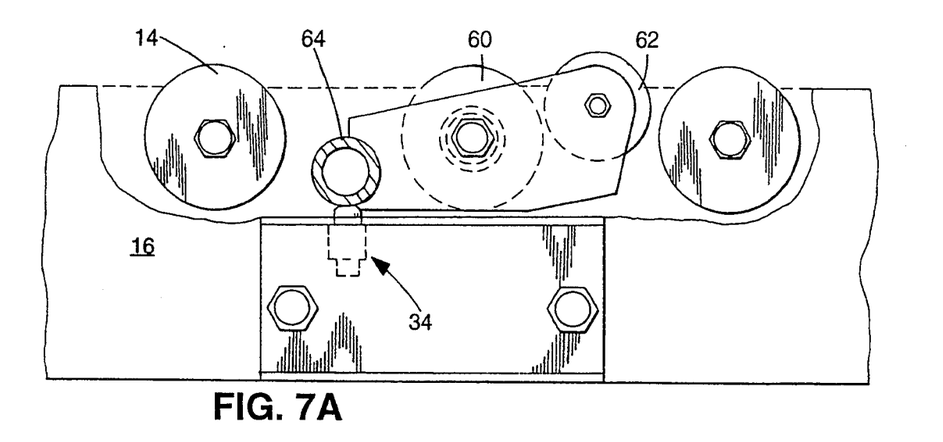
FIG. 7a is a side view of a portion of the inventive gravity conveyor system, with the conveyor frame partially broken away to show the sensor assembly in the normal position.
Figure 7B:
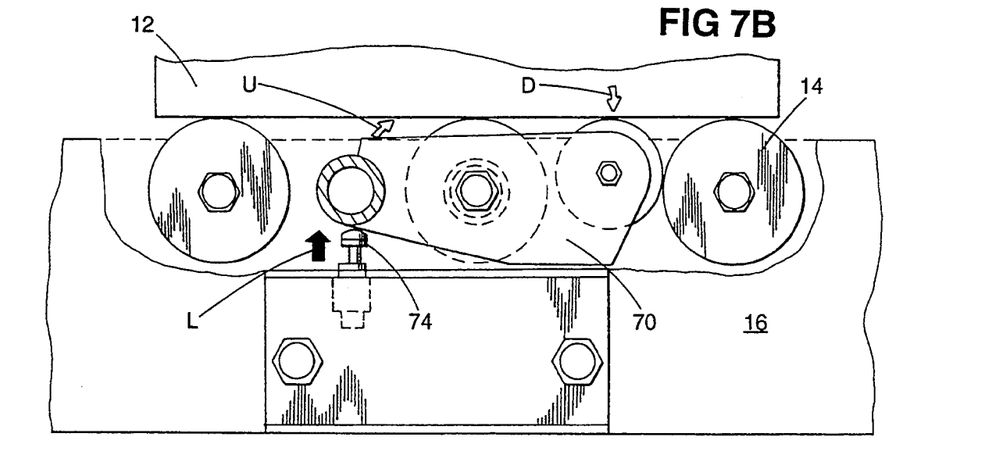
FIG. 7b is a side view similar to FIG. 7a, showing the sensor assembly being tripped by a passing article, leading to actuation of the cooperating brake assemblies to stop rotation of the associated conveyor rollers.

The purpose in operation of the counterweight bar 64 is specifically shown in FIGS. 7a and 7b. FIG. 7a shows the rest or unactuated position where the sensor roller 62 sits above the plane of the conveyor surface defined by the tops of the conveyor rollers 14. As can be appreciated from FIG. 7b, the bridge roller 60 is positioned in the same plane as the conveyor rollers 14. Thus, the bridge roller 60 maintains an uninterrupted planar surface over which the articles 12 travel.

The sensor roller 62 is urged to a raised position as the counterweight bar 64 seeks its lowermost limit position, which in turn pivots the pivot brackets 70 about the adaptor 72. The counterweight bar 64 rests on a plunger 74 associated with an air limit valve 34. When in this position, the depressed plunger 74 prevents the release of air from the limit valve 34.

As an article 12 passes over the sensor assembly 26 as shown in FIG. 7b, the sensor roller 62 is pivoted downward under the weight thereof according to action arrow D. The sensor roller 62 thus assumes a position wherein the top surface thereof is in the same plane as the conveyor rollers 14 and the bridge roller 60. Accordingly, the article 12 is allowed to travel with unimpeded motion thereover.

As the sensor roller 62 pivots downward, the pivot bracket 70 pivots about the adaptor 72. The weight of the article 12 is sufficient to overcome the force exerted by the counterweight bar 64. Thus, the counterweight bar 64 swings upward in accordance with action arrow U. As this occurs, the plunger 74 is released according to action arrow L. As the plunger 74 is lifted, the air limit valve 34 responds to allow air pressure to be supplied to the logic control mechanism 30 and then to the zone conduit 42. This activates the brake assemblies 24 associated with each conveyor roller 14 in the upstream zone. Thus, it can be appreciated that in the particular preferred embodiment of the inventive system 10, the sensor assembly 26 cooperates with the pneumatic control assembly 28 and the brake assemblies 24 to actively stop the rotation of the conveyor rollers 14 after an article 12 has passed thereover.

FIG. 8 illustrates in detail the operation of the preferred logic control mechanism 30 used in the gravity conveyor system 10 of the present invention. It should be recognized that the logic control mechanism 30 is illustrated in block form for simplicity of description. The hardware that implements the control operation may take the form of a single valving device or may be a combination of valve components that cooperate to perform the overall control function.

The line schematic represents a mechanism 30 that is associated with each particular zone of the conveyor system 10. A "B" in port 76 receives air pressure from the backflow conduit 36. An "A" in port 78 receives air pressure from the proximate conduit 38. A "C" out port 80 feeds air to the associated zone conduit 42.

The logic control operation will now be described. As mentioned above, the logic control is particularly useful in implementing selective operation to either stop the rotation of the rollers 14 momentarily to facilitate continued controlled flow along the conveyor system 10 in the continuous transport mode or to maintain active braking to hold the rollers against rotation for a prolonged period of time to halt forward travel and facilitate accumulation in the accumulation mode. The line schematic of FIG. 8 describes an AND connector 82 that is supplied from both the "A" in port 78 and "B" in port 76. In addition to supplying air pressure to the AND connector 80, the "B" in port 76 feeds to a pulse mechanism 84. Further described in the logic block 30 is an OR connector 86 that is fed from the pulse mechanism 84 and the AND connector 82.

It is recognized by those skilled in the art that the AND connector 82 will not operate to supply air pressure to OR connector 86 unless there is an input from both the "A" in port 78 and "B" in port 76. In other words, if air pressure is supplied to the AND connector 82 from either the "A" in port 78 or "B" in port 76, but not the other, there will be no air pressure delivered from AND connector 82 to OR connector 86.

Artisans will also understand that the OR connector 86 operates to supply air pressure to the "C" out port 80 if air pressure is delivered to it from either the AND connector 82 or the pulse mechanism 84. As will be described below, the source of the air pressure to the OR connector 86 determines the character of the air pressure fed to the "C" out port 80, and ultimately, the mode of braking operation.

Cross-referencing now to FIG. 2, and focusing specifically on the middle section thereof, portions of two zones are shown therein. The rightmost air limit valve 34 and the five rightmost diaphragms 48 are associated with a downstream zone. The leftmost air limit valve 34, the logic control mechanism 30 and the three leftmost diaphragms 48 are linked to an upstream zone. As described above, each air limit valve 34 operates to direct air pressure to the "A" in port 78 of the logic control mechanism 30 associated with the corresponding zone and supplies air pressure to the "B" in port 76 of the similar mechanism associated with the zone immediately upstream.

For purposes of description, and keeping the focus on the middle section of FIG. 2, it is assumed that an article 12 is traveling freely along the conveyor system 10 and is in the downstream zone. When the sensor assembly 26 is engaged by the article 12 in that zone, the rightmost air limit valve 34 is opened. Air pressure is thus directed through the proximate conduit 38 to the logic control mechanism 30 associated with the corresponding zone (not shown in the middle section of FIG. 2). Air pressure is also directed through the backflow conduit 36 to the logic control mechanism 30 pictured in the middle section, that mechanism being associated with the zone immediately upstream.

Since continuous forward travel is in order, the article 12 will simply momentarily trip the sensor roller 62 of the sensor assembly 26 in the downstream zone as it passes thereover. There is no air directed into "A" in port 78 of the logic control mechanism 30 of the upstream zone since the next succeeding article 12 has not yet reached the sensor assembly 26 in the upstream zone. Thus, AND connector 82 is inactive. The air supplied by the air limit valve 34 to "B" in port 76 feeds through the pulse mechanism 84 to provide a momentary pulse of air pressure to the OR connector 86. This in turn sends a pulse of air pressure through the "C" out port 80 to the upstream zone conduit 42. The short pulse of air pressure activates the brake assemblies 24 in the upstream zone momentarily to halt the rotation of the conveyor rollers 14 therein. This action brings the rollers 14 to a rest position so that the next succeeding article 12 accelerates them from zero velocity.

If articles 12 are accumulating along the system 10 in the accumulation mode, the logic control mechanism 30 will operate to stop the forward travel of articles in successive upstream zones. Keeping the focus on the middle section of FIG. 2, it is now assumed that an article 12 has stopped in the downstream zone. The system 10 is designed so that when stopped in a particular zone, the article 12 comes to rest directly over the sensor assembly 26 associated with that zone. In this position, the rightmost air limit valve 34 is supplying air through the backflow conduit 36 to the logic control mechanism 30 associated With the adjacent upstream zone as before. As such, air pressure is being directed into the "B" in port 76 thereof.

As the next succeeding article reaches the upstream zone, the sensor assembly 26 thereof is engaged to activate the leftmost air limit valve 34. This operates to supply air pressure to the proximate conduit 38 leading into the logic control mechanism 30 under discussion and thus there is now a positive input to "A" in port 78. Remembering that air supplied to the "B" in port 76 is directed to the AND connector 82, the latter is now activated and sends air pressure to the OR connector 86. This air pressure represents continuous air pressure which is directed to the "C" out port 80 and thus air pressure is now continuously supplied to the zone conduit 42 so that the accumulation mode is maintained and prolonged braking action now occurs in the upstream zone. The next succeeding article 12 will be stopped in the upstream zone and controlled accumulation continues in like manner in successive upstream zones.

It can thus be recognized that the pneumatic control assembly 28 utilizing the logic control mechanism 30 operates in a unique manner to selectively stop momentarily the rollers 14 from rotating to allow positive transport control during continuous flow, or stop the rotation of the rollers for a prolonged period of time to facilitate controlled accumulation and prevent dangerous impacts.

A review of the operation of the inventive system 10 will be described in conjunction with FIGS. 9a through 9d. It will be appreciated that FIGS. 9a through 9d illustrate the inventive system 10 operating in the continuous transport mode. In this series of figures, the three rightmost conventional conveyor rollers 14, along with the rightmost sensor assembly 26, are considered to be in a downstream zone, while the five leftmost conventional rollers and the leftmost sensor assembly are considered in an upstream zone. The article 12 is traveling downstream to the right in accordance with flow arrow F. The declined configuration is less pronounced than that shown in FIG. 1. Nevertheless, it is understood that the article 12 is traveling along the system 10 under the influence of gravity.

Figure 9A:
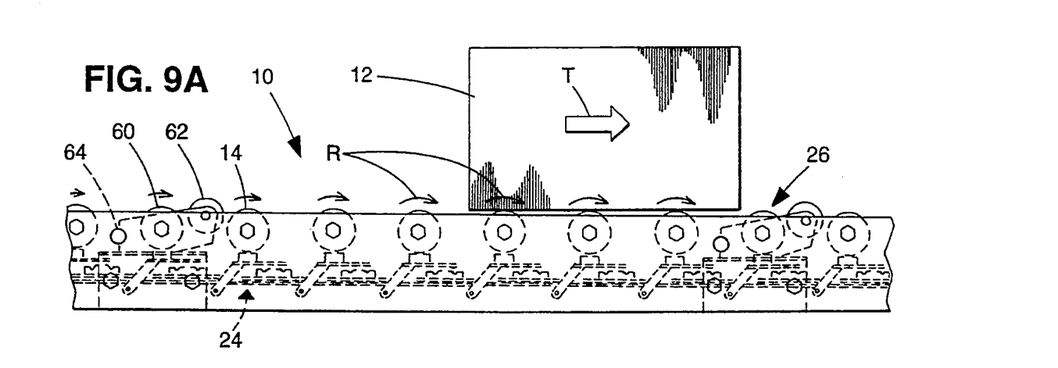
FIGS. 9a–9d are sequence illustrations showing the operation of the controlled flow gravity conveyor system in the continuous transport mode as succeeding articles pass therealong.

In the first series FIG. 9a, the article 12 is entering the downstream zone. As indicated by the rotation arrows R on the engaged conveyor rollers 14, a uniform transfer of kinetic energy from the traveling article 12 has occurred as the rollers have been accelerated from a rest position. Further, as the shortened rotation arrows indicate, the rollers 14 behind the article 12 are slowing down simply due to the inertia naturally associated with the rollers.

Figure 9B:
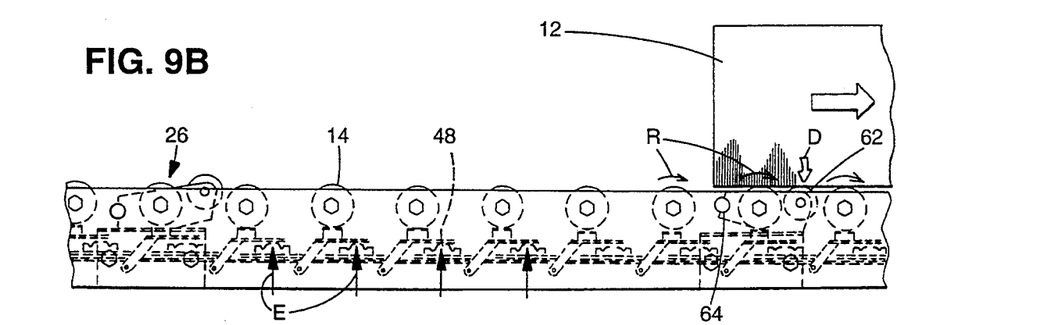

In FIG. 9b, the article 12 has reached the sensor assembly 26 and, in passing thereover, has tripped the sensor roller 62 to pivot downwardly. As described above, this activates the air limit valve 34 which in turn ultimately actuates the pneumatic control assembly 28 to momentarily apply braking action in the upstream zone to stop the rotation of the rollers 14 therein. This is indicated by the action arrows D indicating that the diaphragms 48 are being urged into engagement with the pad plates 52. This in turn urges the brake pads 54 into engagement with the conveyor rollers 14, bringing them to a rest position. It is noted that the last two rollers in the downstream zone, having just released the article 12, are still rotating but are slowing down due to inertia.

Figure 9C:
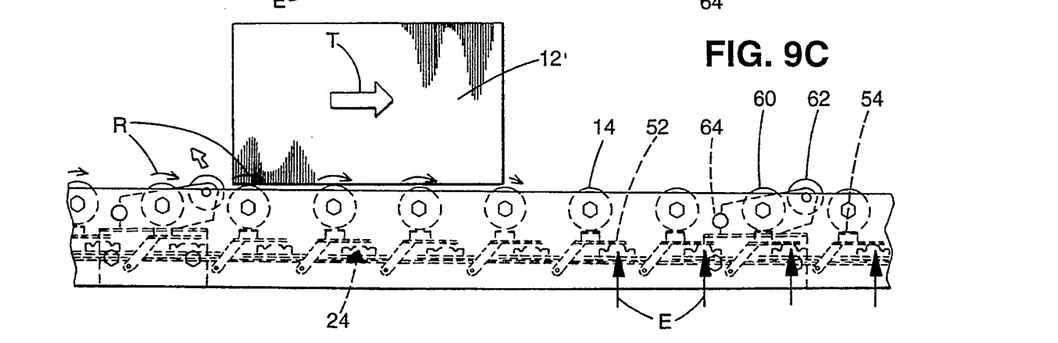

In FIG. 9c, the first article 12 has moved downstream to engage the next sensor assembly 26. This has caused the momentary braking of the last three conventional rollers 14, as well as the bridge roller 62 associated with the sensor assembly 26, in the pictured downstream zone (see action arrows D). Meanwhile, the next succeeding article 12 is in the upstream zone and is approaching the downstream zone. Again as indicated by rotation arrows R, upon engagement of the article 12 with the conveyor rollers 14, full acceleration from a zero velocity position occurs. It can also be appreciated that since the brakes are being momentarily applied to the conveyor rollers 14 and bridge roller 62 in the downstream zone, they will be at a rest position when the article reaches them and makes contact.

Figure 9D:
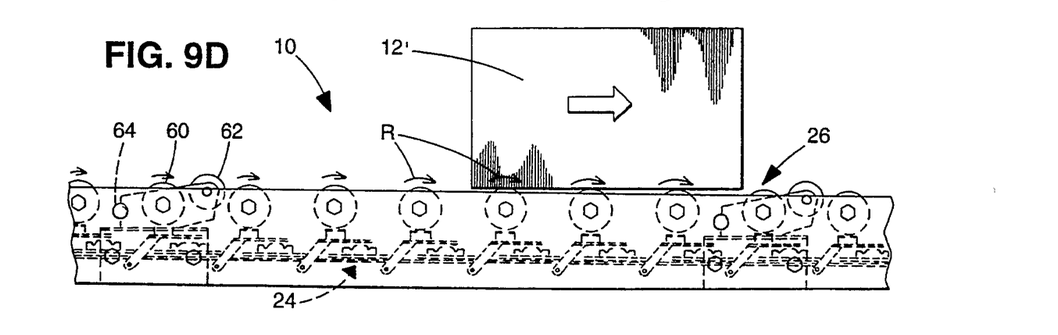

This is confirmed in the last series FIG. 9d. It can be appreciated that FIG. 9d is identical to FIG. 9a, showing how the next succeeding article 12' accelerates the first two rollers 14 in the downstream zone from the rest position. Further, since the article 12' has not yet reached the sensor assembly 26, and the first article 12 has passed the next sensor assembly, FIG. 9d illustrates a brief period in which no braking action is occurring within the two illustrated zones.

In summary, numerous benefits result from applying the teachings of the present invention. The inventive system 10 acts to stop the rotation of the conveyor rollers 14 following the passage of an article 12 and in advance of a next succeeding article. The transported articles 12 thus accelerate the conveyor rollers 14 from a rest position. This allows the terminal velocity of the traveling articles 12 to be determined. The cooperation between the brake assemblies 24, the sensor assembly 26 and the pneumatic control assembly 28 within each operational zone provide positive and precise control for article throughput in the continuous transport mode using gravity as the motive force.

In addition, the inventive system 10 provides a means to controllably accumulate articles 12 along the system by holding the rollers 14 against rotation for a prolonged period of time to prevent continued forward travel in the accumulation mode. This also occurs using operational zones. Thus, the articles 12 may be accumulated without the concern of damaging impacts since gaps are substantially maintained.

The foregoing description of a preferred embodiment of the invention has been presented for purposes of illustration and description. It is not intended to be exhaustive or to limit the invention to the precise form disclosed. Obvious modifications or variations are possible in light of the above teachings. For instance, a number of modes of logic other than that described above may be employed to promote the desired operational control. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with the breadth to which they are fairly, legally and equitably entitled.

We claim:

1. A controlled flow gravity conveyor system, comprising:
   a plurality of rollers for transporting articles from a source point to a discharge point;
   means for supporting said rollers in a declined configuration in the direction of travel; and
   means for actively stopping the rotation of said rollers in association with disengagement with a first article after it passes over said rollers and in advance of a next succeeding article to facilitate a predicted equilibrium velocity of said articles when in uninterrupted free-flowing travel,
   whereby precise transport control is effected without the use of a positive drive mechanism.

2. The controlled flow gravity conveyor system of claim 1, wherein said stopping means operates intermittently to momentarily stop the rotation of said rollers in said continuous transport mode.

3. The controlled flow gravity conveyor system of claim 2, wherein said stopping means further operates to hold said plurality of rollers against rotation for a prolonged period of time to halt the forward movement of said article along said system in said accumulation mode.

4. The controlled flow gravity conveyor system of claim 1, wherein said stopping means comprises a plurality of brake assemblies that operate against said plurality of rollers.

5. The controlled flow gravity conveyor system of claim 4, wherein one of each said plurality of brake assemblies operates against one of each of said plurality of rollers.

6. The controlled flow gravity conveyor system of claim 1, further including means for stopping, without impact against an extraneous stop mechanism, the forward movement of said article at said discharge point.

7. The controlled flow gravity conveyor system of claim 6, wherein said forward movement stopping means comprises means to stop the rotation of said rollers in substantial proximity to the discharge point in advance of the arrival of one of said articles.

8. The controlled flow gravity conveyor system of claim 7, wherein said roller rotation stopping means comprises a plurality of brake assemblies which are controllably applied to an associated plurality of rollers in substantial proximity to said discharge point.

9. The controlled flow gravity conveyor system of claim 3, wherein said stopping means, in holding said plurality of rollers against rotation for a prolonged period of time in said accumulation mode, operates to facilitate controlled and separated accumulation of a plurality of articles along said system.

10. The controlled flow gravity conveyor system of claim 9, wherein said stopping means further operates to substantially eliminate line pressure associated with said accumulated articles.

11. A controlled flow gravity conveyor system, comprising:
    a plurality of rollers for transporting articles from a source point to a discharge point;
    means for supporting said rollers in a declined configuration in the direction of travel;
    means for sensing the position of said articles at various points along said plurality of rollers; and
    means for stopping the rotation of said rollers in response to the sensed position of a first article, after said first article has passed over said rollers, and in association with disengagement with said rollers, and in advance of a next succeeding article to facilitate a predicted equilibrium velocity of said articles when in uninterrupted free-flowing travel,
    whereby precise transport control is effected without the use of a positive drive mechanism.

12. The controlled flow gravity conveyor system as in claim 11, further including means for selectively controlling the stopping means in response to the sensed position of said article.

13. The controlled flow gravity conveyor system as in claim 12, defined by a plurality of operational zones, each zone having an operable set of sensing means, stopping means and controlling means.

14. The controlled flow gravity conveyor system as in claim 11, wherein said stopping means comprises means for stopping said plurality of rollers momentarily to allow continued passage of said next succeeding article in said continuous transport mode and means for stopping said plurality of rollers for a prolonged period of time to prevent continued passage of said next succeeding article in said accumulation mode.

15. The controlled flow gravity conveyor system as in as in claim 14, wherein said prolonged-period stopping means operates to facilitate controlled and separated accumulation of a plurality of articles along said system in said accumulation mode.

16. The controlled flow gravity conveyor system as in claim 15, wherein said stopping means further operates to substantially eliminate line pressure associated with said accumulated articles.

17. The controlled flow gravity conveyor system as in claim 11, wherein said stopping means operates without extraneous assistance to stop an article at said discharge point of said conveyor system.

18. The controlled flow gravity conveyor system as in claim 13, wherein said controlling means operates said stopping means in an upstream zone with respect to said sensing means.

19. The controlled flow gravity conveyor system as in claim 11, wherein said sensing means comprises a plurality of sensor assemblies positioned at strategic points along said conveyor system.

20. The controlled flow gravity conveyor system as in claim 11, wherein said stopping means comprises a plurality of brake assemblies that engage said plurality of rollers.

21. The controlled flow gravity conveyor system as in claim 12, wherein said controlling means comprises a mechanical operating system.

22. The controlled flow gravity conveyor system as in claim 21, wherein said mechanical operating system comprises a pneumatic control system.

23. The controlled flow gravity conveyor system as in claim 22, wherein said pneumatic control system influences said stopping means to alternatively stop rotation of said rollers momentarily to facilitate controlled forward movement of said article in said continuous transport mode or stop rotation of said rollers for a prolonged period of time to facilitate controlled accumulation of articles in said accumulation mode.

24. The controlled flow gravity conveyor system of claim 12, wherein said control means influences said stopping means to stop the rotation of said rollers momentarily to facilitate controlled forward movement of said article in said continuous transport mode.

25. The controlled flow gravity conveyor system of claim 24, wherein said control means influences said stopping means to stop the rotation of said rollers for a prolonged time period to facilitate controlled accumulation of articles in said accumulation mode.

26. The controlled flow gravity conveyor system as in claim 25, wherein said control means and said stopping means cooperate to facilitate controlled and separated accumulation of a plurality of articles along said system in said accumulation mode.

27. The controlled flow gravity conveyor system as in claim 26, wherein said control means and said stopping means further cooperate to substantially eliminate line pressure associated with said accumulated articles.

28. A method of controlling the transport of articles along a conveyor system without positive drive assistance, comprising the steps of:
  providing a plurality of rollers supported in a declined configuration in the direction of travel;
  sensing the position of said articles at various points along said plurality of rollers; and
  stopping the rotation of said rollers in response to the sensed position of a passing article in association with disengagement with said passing article and in advance of a next succeeding article to facilitate a predicted equilibrium velocity of said articles when in uninterrupted free-flowing travel,
  whereby precise transport control is effected.

29. The method of controlling the transport of articles along a conveyor system as in claim 28, further comprising the step of controlling the stopping of rotation of rollers in response to the sensed position of said articles.

30. The method of controlling the transport of articles along a conveyor system as in claim 29, wherein said roller stopping step comprises, alternatively, stopping the rotation of said rollers momentarily to allow continued passage of a next succeeding article in said continuous transport mode, or stopping the rotation of said rollers for a prolonged period of time to prevent continued passage of a next succeeding article in said accumulation mode.

31. The method of controlling the transport of articles along a conveyor system as in claim 30, wherein said prolonged-period roller stopping step further comprises the step of controllably and separatingly accumulating a plurality of articles along said system in said accumulation mode.

32. The method of controlling the transport of articles along a conveyor system as in claim 31, further comprising the step of substantially eliminating line pressure associated with said accumulated articles.

33. The method of controlling the transport of articles along a conveyor system as in claim 28, further comprising the step of providing a plurality of operational zones in which transport control is effected.

34. The method of controlling the transport of articles along a conveyor system as in claim 33, wherein said roller stopping step comprises stopping the rotation of said rollers in a zone upstream from the zone defined by the sensed position of an article.

35. A controlled flow gravity conveyor system, comprising;
  a plurality of rollers for transporting an article from a source point to a discharge point;
  means for supporting said rollers in a declined configuration in the direction of travel;
  means for sensing the position of said article at various points along said plurality of rollers, said sensing means comprising a plurality of sensor assemblies positioned at strategic points along said conveyor system;
  each sensor assembly comprising a bridge roller, a sensor roller and a counterweight element; and
  means for stopping the rotation of said rollers in response to the sensed position of said article after said article has passed thereover and in advance of a next succeeding article,
  whereby precise transport control is effected without the use of a positive drive mechanism.

36. The controlled flow gravity conveyor system of claim 55, wherein said bridge roller is disposed between said sensor roller and said counterweight element.

37. The controlled flow gravity conveyor system of claim 36, wherein a set of pivot brackets mount the bridge roller, sensor roller and counterweight element at each of their respective ends so as to allow the sensor roller and counterweight element to pivot about the axis of said bridge roller.

* * * * *

UNITED STATES PATENT AND TRADEMARK OFFICE
CERTIFICATE OF CORRECTION

PATENT NO. : 5,375,689
DATED : December 27, 1994
INVENTOR(S) : Gordon K. Sapp and Mark W. Henson It is certified that error appears in the above-indentified patent and that said Letters Patent is hereby corrected as shown below:

In Claim 2, column 15, lines 20-21; Claim 14, column 16, line 22; Claim 23, column 16, lines 62-63; Claim 24, column 17, line 2 and Claim 30, column 17, lines 40-41, delete "in said continuous transport mode".

In Claim 3, column 15, lines 26-27; Claim 9, column 15, line 54; Claim 14, column 16, line 25; Claim 15, column 16, line 30; Claim 23, column 16, line 65; Claim 25, column 17, line 7; Claim 26, column 17, line 12; Claim 30, column 17, lines 43-44 and Claim 31, column 18, lines 3-4, delete "in said accumulation mode".

Signed and Sealed this

Eleventh Day of April, 1995

Attest:

BRUCE LEHMAN

Attesting Officer  Commissioner of Patents and Trademarks